W. R. SMITH.
AGRICULTURAL MACHINE.
APPLICATION FILED OCT. 16, 1915.
1,189,501.
Patented July 4, 1916.
3 SHEETS—SHEET 3.
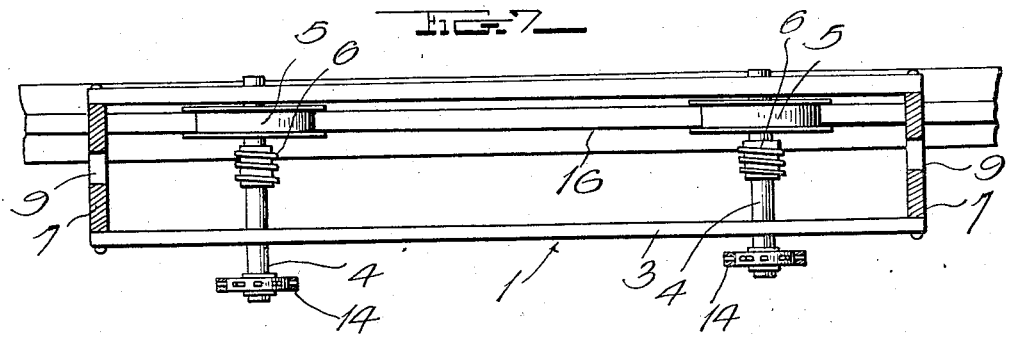
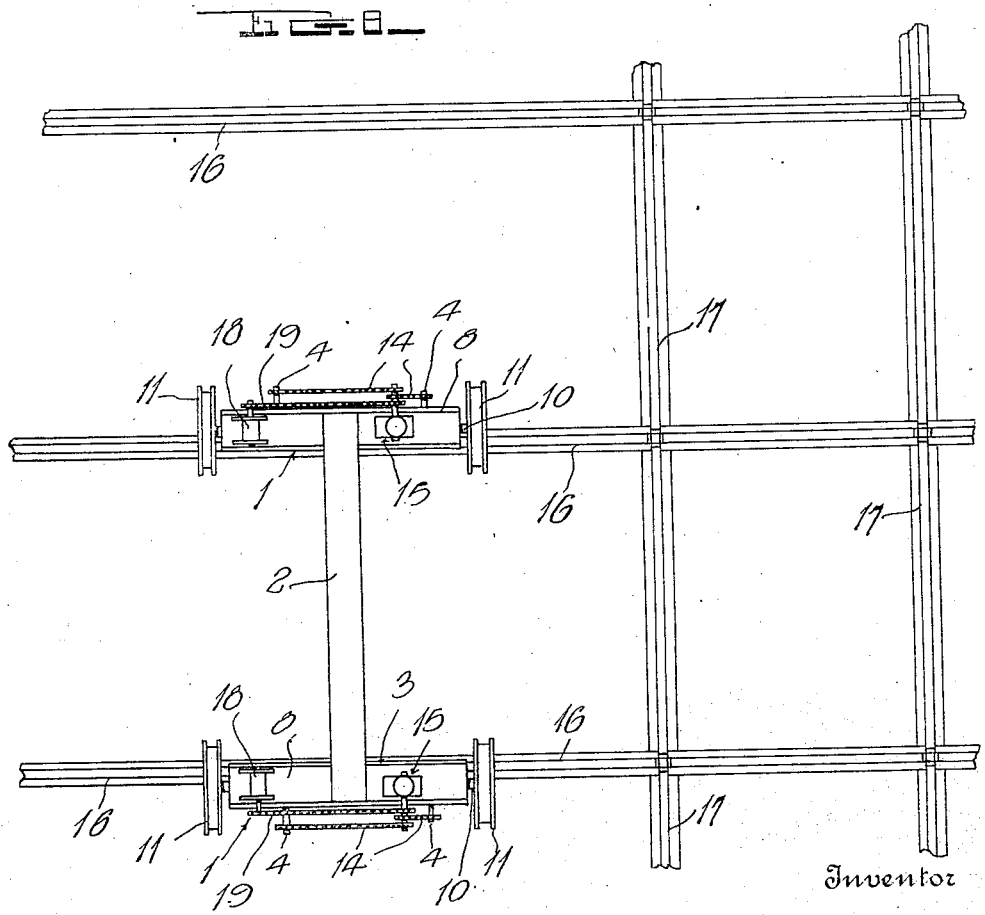
Witnesses
H. Woodard
Inventor
W. R. Smith
By H. B. Willson & Co.
Attorneys

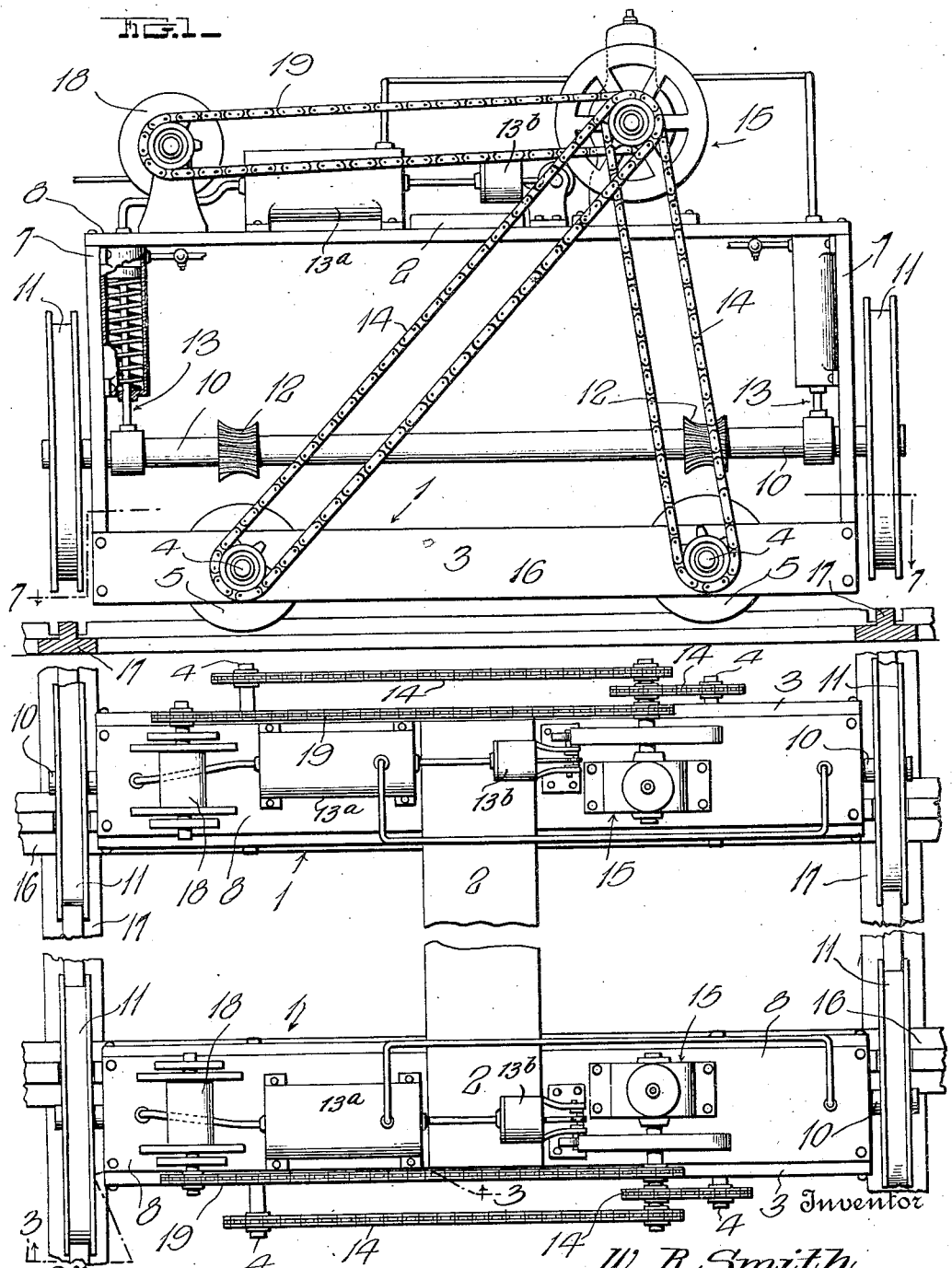

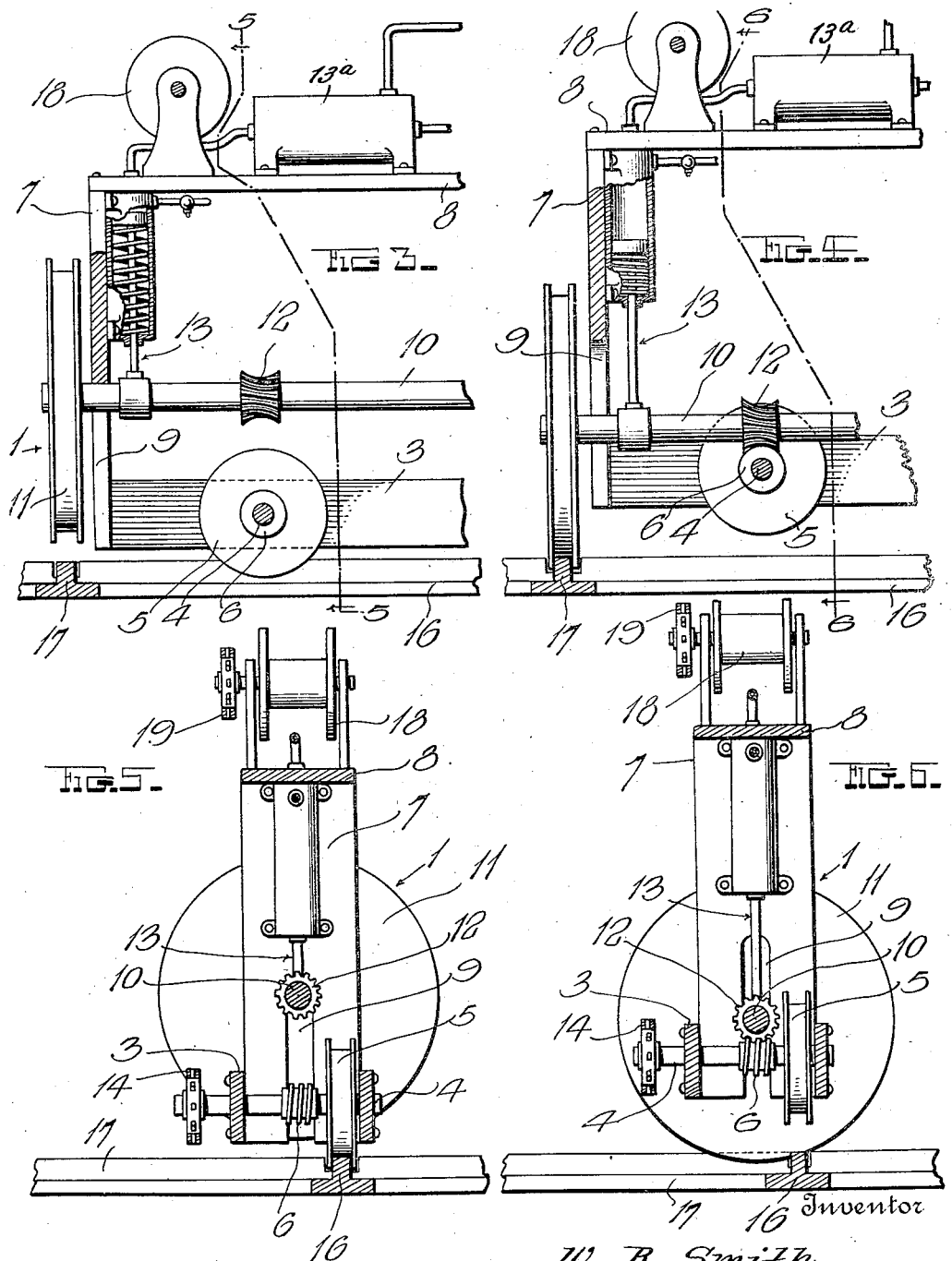

UNITED STATES PATENT OFFICE.

WILLIAM ROLLIN SMITH, OF CENTRALIA, ILLINOIS.

AGRICULTURAL MACHINE.

1,189,501.  Specification of Letters Patent.  Patented July 4, 1916.

Application filed October 16, 1915. Serial No. 56,237.

*To all whom it may concern:*

Be it known that I, WILLIAM ROLLIN SMITH, a citizen of the United States, residing at Centralia, in the county of Marion and State of Illinois, have invented certain new and useful Improvements in Agricultural Machines; and I do declare the following to be a full, clear, and exact description of the invention, such as will enable others skilled in the art to which it appertains to make and use the same.

My invention relates broadly to improvements in agricultural machines, and more particularly to such a device designed to travel upon trackways laid upon fields to be plowed, harrowed, or worked in any other manner, thus preventing the heavy machine from sinking into the earth and thereby requiring less power to propel the same, with the result that more earth-working implements may be drawn forwardly at the same time.

The objects of the invention are to provide a machine of the class described which will be simple, efficient, and durable, and one which may readily be shifted from one set of trackways to another.

With this general object in view, the invention resides in certain novel features of construction and in unique combinations of parts to be hereinafter fully described and claimed, the descriptive matter being supplemented by the accompanying drawings which constitute a part of this application and in which:

Figure 1 is an end elevation of a machine constructed in accordance with my invention; Fig. 2 is a top plan view thereof with parts broken away; Figs. 3 and 4 are detail longitudinal sections through the front end of one truck showing such truck disposed for traveling respectively on the longitudinal and transverse tracks; Figs. 5 and 6 are vertical transverse sections taken respectively on the planes of the lines 5—5 of Fig. 3 and 6—6 of Fig. 4; Fig. 7 is a horizontal section as viewed on the plane indicated by the line 7—7 of Fig. 1; and Fig. 8 is a diagram showing the relation of the machine to the longitudinal and transverse tracks.

In describing the invention, reference will be made to the drawings above briefly described, by similar reference characters placed on corresponding parts throughout the several views.

The numerals 1 indicate a pair of laterally spaced trucks connected by a beam 2 of any preferred construction and usually of approximately one hundred feet in length. Since the construction of each truck 1 is the same, but one will be described.

To this end, 3 indicates a rectangular base frame of any suitable construction in which a pair of longitudinally spaced transversely disposed axles 4 are rotatably mounted, said axles being provided near their centers with double flanged wheels 5 adapted to propel the entire machine forwardly and rearwardly, while on one side of such wheels, each axle 4 is equipped with a worm 6.

Rising from the ends of the frame 3, is a pair of upright end plates or the like 7 connected at their upper ends by a horizontal crown bar or plate 8. The lower end of the plates 7 are slotted vertically as disclosed at 9 and receive in such slots a longitudinally extending horizontal axle 10 whose ends are equipped with double flanged wheels 11 adapted to move the entire machine laterally when desired. The end portions of the axle 10 are equipped with gears 12 which are adapted to engage the worms 6 when said axle is forced downwardly within the slots 9 to allow the truck to be raised and supported on its wheels 11. It follows, that since the axles 4 are driven by sprocket chains or the like 14 from a power plant 15 preferably in the form of a gasolene engine, the axle 10 will be driven when the gears 6 and 12 are interengaged.

The machine constructed as above described, is adapted to travel lengthwise of a field upon longitudinally disposed tracks 16 which may be of any preferred construction, such tracks being designed for engagement by the flanged wheels 5. It will thus be evident that a number of implements (not shown) may be attached to the beam 2, whereupon as the machine is propelled forwardly, the earth between the tracks may be effectively worked by such implements, which latter may be of any of the numerous types now used for agricultural purposes.

At one or both ends of the field, a pair of transverse tracks 17 are provided, whereby the machine may be so operated as to position the wheels 11 above such tracks, whereupon the jacks 13 may be applied to use, thus forcing the aforesaid wheels downwardly onto the tracks and raising the machine and its wheels 5 until the gears 6 and 12 are interengaged. The jacks 13 may be of any suitable construction, being here shown of a common fluid pressure type operated from compressed air tanks 13$^a$ which are carried by the machine, said tanks being supplied with air from air compressors 13$^b$ driven in any appropriate manner from the engines 15.

While shifting the weight of the machine from one set of wheels to the other, the engines 15 will either be stopped, or suitable clutches will be thrown out, but after the wheels are correctly positioned upon the tracks 17, power will be applied to such wheels through the instrumentality of the chains 14, axles 4, and gears 6 and 12, the result being that the entire machine will be shifted laterally to allow its wheels 5 to travel upon additional longitudinal tracks 16.

By operating the improved machine in the manner above set forth, it will be obvious that numerous grades of land may be effectively worked, yet that the wheels of the machine will not sink into such land. The provision of the tracks 16 and 17, therefore, overcomes a great deal of friction heretofore encountered by heavy types of agricultural machines, thus necessitating the use of less power.

In some cases, when extremely heavy work is being performed, the propelling power of the wheels 5 is preferably supplemented by a pair of windlasses 18 carried one by each truck and adapted to be driven by chains or the like 19 from the engines 15, whereby cables (not shown) may be wound on such windlasses to move the machine forwardly, it being understood that such cables are to be anchored at one end of the field.

From the foregoing description, taken in connection with the accompanying drawings, it will be obvious that although the improved construction is comparatively simple, it will be highly efficient and durable and will possess a number of advantageous characteristics.

In the drawings, certain specific details have been shown for illustrative purposes, and in the preceding pages such details have been described, but obviously numerous changes may be made within the scope of the invention without sacrificing any of the advantages thereof.

I claim:

1. A machine of the class described comprising a truck, a wheel for moving said truck forwardly, a power plant for driving said wheel, a driving member likewise driven by said power plant, an additional and normally raised wheel for moving the truck laterally, means for lowering said additional wheel whereby the weight of the truck may rest thereon, and an additional driving member for said additional wheel, said member being movable downwardly with said wheel for engagement with the other driving member.

2. A machine of the class described comprising a truck, a wheel for moving the same forwardly, said wheel having at its axis a rotary member movable therewith and equipped with a gear, means for driving said rotary member, an additional and normally raised wheel for moving the truck laterally, means for lowering said additional wheel whereby the weight of the truck may be supported thereon, and a gear for driving said additional wheel spaced normally above the other gear but movable downwardly with said wheel, whereby it may engage said other gear.

3. A machine of the class described comprising a truck, a wheel for moving the same forwardly, said wheel having at its axis a rotary member movable therewith and equipped with a gear, means for driving said rotary member, an additional and normally raised wheel for moving the truck laterally, and means for lowering said additional wheel whereby the weight of the truck may be supported thereon, said additional wheel having at its axis a rotary member movable therewith and equipped with a gear for engagement with the aforesaid gear when the additional wheel is lowered.

4. A machine of the class described comprising a truck, a wheel for moving the same forwardly and a power plant for driving said wheel, a gear also driven by said plant, a normally raised wheel for moving the truck laterally, said wheel having at its axis a rotary member movable therewith and equipped with a gear spaced normally above the other gear, and means for lowering the additional wheel at will whereby to simultaneously support the weight of the machine upon said wheel, and to interengage the two gears.

5. A machine of the class described comprising a truck frame, a pair of longitudinally spaced transversely disposed horizontal axles carried rotatably thereby and having gears, wheels secured to said axles, means for driving said axles, a horizontal longitudinally disposed axle carried by the frame for vertical movement and positioned above the other axles, wheels secured to said longitudinal axle, means for lowering said axle at will, and gears on the latter for engagement with the gears on the transverse axles.

In testimony whereof I have hereunto set my hand in presence of two subscribing witnesses.

WILLIAM ROLLIN SMITH.

Witnesses:
C. F. LUEDER,
EDW. BAILEY.